United States Patent [19]
Lehman

[11] 3,807,363
[45] Apr. 30, 1974

[54] ANIMAL DIPPING TANK

[76] Inventor: Harold E. Lehman, R.D. 2, Wellsville, N.Y. 14895

[22] Filed: May 11, 1973

[21] Appl. No.: 359,365

[52] U.S. Cl. .............................................. 119/158
[51] Int. Cl. ........................................... A61d 11/00
[58] Field of Search ..................... 119/156, 158, 29

[56] References Cited
UNITED STATES PATENTS
3,485,213  12/1969  Scanlon ......................... 119/158 X
3,208,434   9/1965  Barton ............................... 119/158

Primary Examiner—Robert Peshock
Assistant Examiner—J. N. Eskovitz
Attorney, Agent, or Firm—Wayne H. Lang

[57] ABSTRACT

A mobile tank assembly that contains a quantity of fluid in which animals may be submerged in order that they be subjected to the medicinal, insecticidal or cleansing effects of the fluid. The tank is provided with a loading ramp that presents the animals to a platform adjacent the upper edge of said tank and an unloading ramp that permits the animals to descend from the tank. The loading and unloading ramps are specifically arranged to be moved between an operative and an inoperative position to facilitate moving the assembly.

7 Claims, 4 Drawing Figures

PATENTED APR 30 1974  3,807,363

3,807,363

ANIMAL DIPPING TANK

BACKGROUND OF THE INVENTION

This invention relates to a mobile dipping tank containing fluid into which animals are to be submerged. Although dipping tanks have been in use for the avowed purpose of subjecting various animals to a medicinal or disinfecting fluid, they have usually been permanent installations that included extensive fencing, ramps, pens and gates. In an attempt to make such apparatus mobile, the tank was simply placed on a wheeled platform with substantially the same complex assembly ramps, fences, gates and the like being required to carry out the original function. Moreover, for a generally complex arrangement, several operators were required to lift and assemble the various parts, and more importantly, several operators were then required to subject the animals to the fluid.

SUMMARY OF THE INVENTION

This invention provides for a mobile dipping tank arrangement whereby a lone individual may erect or dismantle a stock dipping tank, and then may himself quickly and easily perform all the steps necessary to subject various types of livestock to fluid in the dipping tank.

BRIEF DESCRIPTION OF THE DRAWING

A more complete understanding of my device may be had by referral to the drawings in which.

DESCRIPTION OF THE PREFERRED EMBODIMENT

Figure 1:
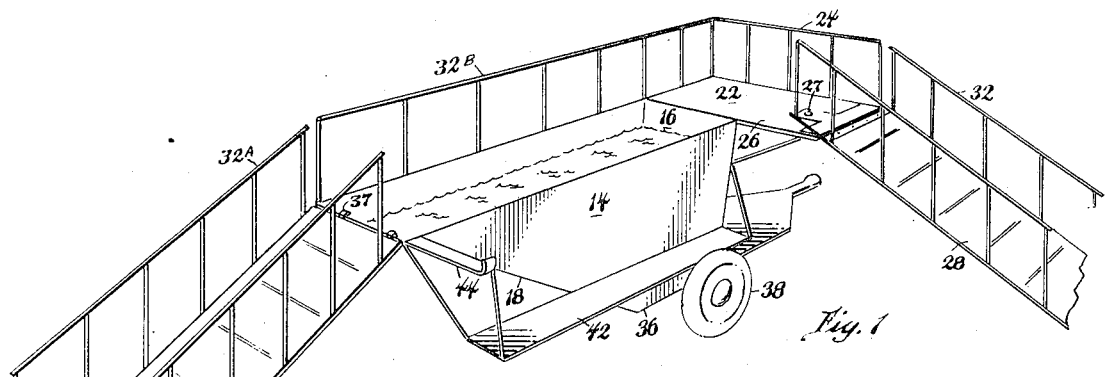
FIG. 1 is a perspective view of the apparatus assembled in an operative position.
Figure 2:
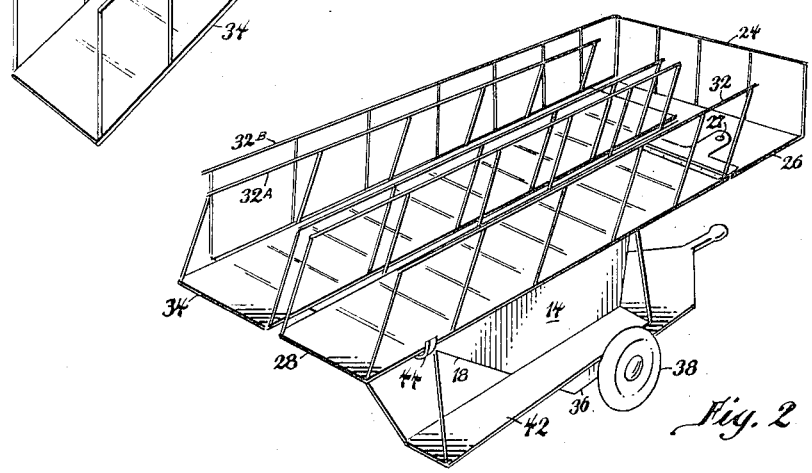
FIG. 2 is a perspective view of a tank dipping apparatus with ramp-like walkways thereof withdrawn for transportation

The apparatus, according to this invention comprises essentially a tank or vat 14 for dipping fluid sized to accapt the desired animal. A loading end 16 of the tank is substantially vertically disposed while an unloading end 18 is sloped upward and outward to comprise a ramp-like walkway over which animals may walk to emerge from fluid in the tank.

Adjacent the top edge of the loading end 16 is positioned a rectangular working platform 22 enclosed by a fence-like guide 24 on two sides and open to the tank on one side 25. The remaining side of the platform is connected to an extension 26 of substantially the same overall size as the platform 22.

A loading ramp 28 having a retaining fence or grill 32 on the sides thereof is supported by the extension 26 at one end and on the ground or similarly fixed point at the other end. The loading ramp is preferably attached to the extension 26 by a pivoted means 27 whereby it may be supported thereby in any of several positions as the ramp is moved circumferentially to any position necessary to permit livestock from a given location to walk up the ramp 28 to tbe platform 22.

Figure 3:
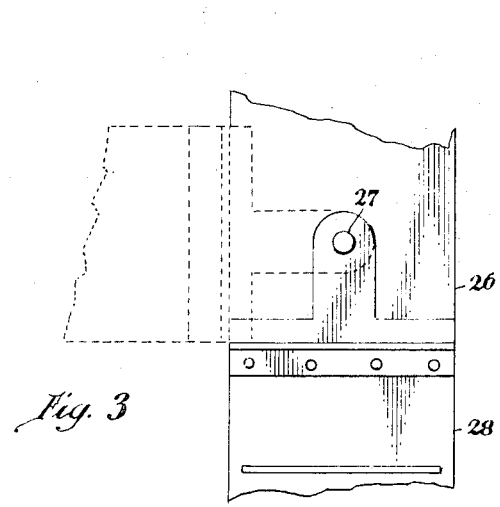
FIG. 3 is a perspective view of a preferred form of pivot joint that connects a loading ramp to the side of the tank dipping apparatus.
Figure 4:
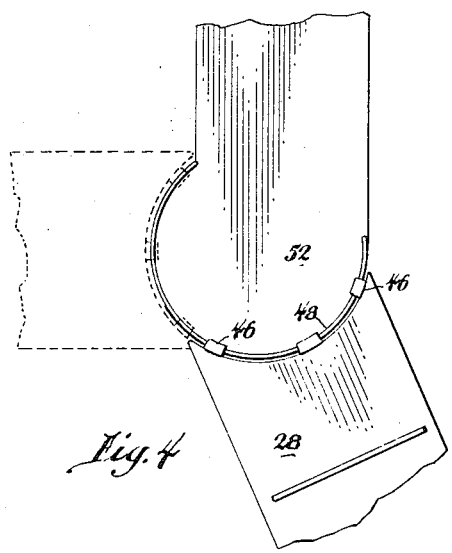
FIG. 4 is a perspective view of a modified form of pivot for the loading ramp.

The pivot arrangement for the loading ramp may comprise a simple bolt that traverses concentric openings in the platform extension and on the loading ramp. It may otherwise include a device as shown in FIG. 3 where a pivot pin 27 or the like is centrally located on the extension 26 (or the loading ramp 28) and is adapted to receive an elongate opening 35 on an end of the loading ramp 28 (or extension 26) thus enabling said loading ramp to be rotated in a circular path having the pivot pin 27 as a center.

An unloading ramp 34 having fenced sides 32A is adapted to be supported at one end by or adjacent the top end edge of the ramp-like end 18 of the tank whereby livestock emerging from the tank 14 over the inclined end 18 may descend to the ground level over ramp 32A. When the apparatus is being moved between jobs, the ramp 32A is simply pushed on to the top of tank 14 and clamped down by any suitable "tie-down" apparatus to make integral with the tank to preclude movement while in transit. A conventional clamping means or hook 37 may be used to hold the ramp to the end of the tank while actually being used by livestock as a walkway.

The entire tank and ramp assembly is carried upon a suitable trailer bed 36 having wheels 38 spaced apart to provide satisfactory stability. Adjacent the lower edge of one side is positioned an operator's platform 42 on which an operator may stand to effect movement of an animal from the platform 22 into the fluid of tank 14.

A bracket 44 is secured outboard from the end of tank 14 opposite extension 26 whereby the ramp 28 may be rotated about the pivot 27 and supported between the extension and bracket.

The loading ramp 28 may otherwise cooperate with the extension 26 to enable it to be pivotally attached thereto, either temporarily or permanently. Thus the ramp may have a plurality of supports 46 that run on a track 48 around the periphery of a semi-circular extension 52. Similarly, an end of the loading ramp 28 might simply rest upon extension 26 and be temporarily clamped thereto to provide any desired relationship.

In operation, the trailer with the tank thereon may remain attached to a tractor or other towing vehicle to impart stability to the dipping tank and fluid therein. In an installation without the stabilizing effect of a tractor or towing vehicle, satisfactory stability may be achieved by simply inserting several concrete blocks or timbers under the front and rear ends, although no invention would be seen in forming a folding leg type-support under the front and rear ends of the apparatus.

Further, the size and type of tank, ramps, fencing or other accessories may be altered without resorting to invention. It is intended therefore that the following claims should be considered as examples only and not in a limiting sense.

I claim:

1. Apparatus for submerging animals in a liquid bath comprising an open tank having a substantially vertically disposed end wall and a relatively inclined end wall forming a ramp that extends outwardly from the bottom of the tank, a loading platform adjacent the top of the vertically disposed end wall, loading ramp having an end thereof pivotally supported by the platform and having an outboard end which rests upon the ground, and bracket means adjacent the inclined end of said tank for supporting said outboard end of the loading ramp when said loading ramp is pivoted about the support on the platform.

2. Apparatus as defined in claim 1 including a pivot means connecting the platform to the loading ramp whereby said loading ramp may be rotated about a pivot point supported by the platform.

3. Apparatus for momentarily submerging animals in a liquid medium comprising an open tank having a substantially vertically disposed loading end wall and an unloading end wall that is inclined outwardly from the bottom of the tank, side walls connecting end walls of said tank, a platform for animals adjacent the top edge of the loading end of said tank, an extension to said platform extending laterally beyond a side wall of said tank, a loading ramp having an inboard end thereof supported by the extension and an outboard end that extends to the ground, and bracket means adjacent a side of said tank for supporting the outboard end of the loading ramp when the loading ramp is moved circumferentially about the extension to said platform.

4. Apparatus as defined in claim 3 including a pivot means connecting the loading ramp to the extension whereby said loading ramp may be rotated about a center point on said extension.

5. Apparatus as defined in claim 4 including an unloading ramp having an inboard end adapted to rest upon the unloading end wall while an outboard end thereof is inclined downwardly to the ground, said unloading ramp having an overall size substantially the same as that of said loading ramp whereby it may be retracted on to said tank to lie adjacent the loading ramp.

6. Apparatus as defined in claim 3 including an operator's platform horizontally disposed adjacent a lower side wall of said tank.

7. Apparatus as defined in claim 6 wherein the operator's platform lies intermediate the extension to said platform and the bracket means whereby an operator on said platform is continuously adjacent animals negotiating the loading ramp and the tank.

* * * * *